(12) United States Patent
Salgado et al.

(10) Patent No.: US 12,455,785 B2
(45) Date of Patent: *Oct. 28, 2025

(54) METHOD FOR MANAGING DATA STORED IN A PAGE WITHIN A MEMORY ELEMENT

(71) Applicant: EM Microelectronic-Marin SA, Marin (CH)

(72) Inventors: Stéphanie Salgado, La Neuveville (CH); Thomas Eberhardt, Cernier (CH)

(73) Assignee: EM Microelectronic-Marin SA, Marin (CH)

( * ) Notice: Subject to any disclaimer, the term of this patent is extended or adjusted under 35 U.S.C. 154(b) by 44 days.

This patent is subject to a terminal disclaimer.

(21) Appl. No.: 18/520,697

(22) Filed: Nov. 28, 2023

(65) Prior Publication Data

US 2024/0211348 A1    Jun. 27, 2024

(30) Foreign Application Priority Data

Dec. 23, 2022  (EP) ..................................... 22216564

(51) Int. Cl.
*G06F 11/10*    (2006.01)
*G06F 11/00*    (2006.01)

(52) U.S. Cl.
CPC ................. *G06F 11/1076* (2013.01)

(58) Field of Classification Search
CPC .......... G06F 11/1048; G06F 11/1076
See application file for complete search history.

(56) References Cited

U.S. PATENT DOCUMENTS

2009/0100315 A1    4/2009  Lee
2024/0211342 A1*   6/2024  Salgado ............. G06F 11/1044

OTHER PUBLICATIONS

European Search Report issued Jun. 2, 2023 in European Application 22216564.9 filed on Dec. 23, 2022 citing document 1 therein, 2 pages.

* cited by examiner

*Primary Examiner* — Justin R Knapp
(74) *Attorney, Agent, or Firm* — Oblon, McClelland, Maier & Neustadt, L.L.P.

(57) ABSTRACT

A method for managing data stored in a page (P) within a memory element of a memory system including a controller, the page (P) including at least one encoded data (E) consisting in a binary code being formed by a word (W 0-N) and its associated redundancy code (RC 0-N), the method including a step of storing a user data in this page (P) implemented by the controller, this step including a sub-step of performing error correction code (ECC) calculations on the user data providing an associated redundancy code (RC 0-N) corresponding to an erased redundancy code (RC E) for this user data if it has a reference binary code (br) of an erased word (W E) the erased redundancy code (RC E) having a binary value similar to that of the reference binary code (br).

14 Claims, 2 Drawing Sheets

METHOD FOR MANAGING DATA STORED IN A PAGE WITHIN A MEMORY ELEMENT

CROSS-REFERENCE TO RELATED APPLICATION

This application claims priority to European Patent Application No. 22216564.9 filed on Dec. 23, 2022, the entire disclosure of which is hereby incorporated herein by reference.

FIELD OF THE INVENTION

Embodiments of the present disclosure relate to a method for managing data stored in a page within a memory element of a memory system.

BACKGROUND OF THE INVENTION

A memory system is used to store a wide variety of data. With increasing memory capacity, a mixture of information (e.g., program files, set-up files, user data, etc.) corresponding to a variety of storage applications can be conveniently stored in this memory system which can be a removable flash memory card or drive that attaches to a host computer. Many of these memory systems demand high levels of data integrity over the life of this system.

Error Correcting Codes (ECC) are sometimes used in such a memory system to increase data integrity. During write operations, this memory system implements a method of management of data which calculates ECC values that describe the write data, and stores these ECC values in a memory element with the write data. On read operations, this method determines whether the ECC values read from memory element are consistent with the corresponding data values read from memory element. If an ECC error is detected (i.e., the ECC is not consistent with the data), the method can, in some cases, correct the error.

A need exists for an alternative method for managing data implementing the detection and correction of ECC errors.

SUMMARY OF THE INVENTION

An object of the invention is to provide a method for managing data stored in a page within a memory element of a memory system including a controller, the page comprising at least one encoded data consisting in a binary code being formed by a word and its associated redundancy code, the method comprising a step of storing a user data in this page implemented by the controller, this step including a sub-step of performing error correction code calculations on the user data providing an associated redundancy code corresponding to an erased redundancy code for this user data if it has a reference binary code of an erased word the said erased redundancy code having a binary value similar to that of the reference binary code.

In other embodiments:
the sub-step of performing comprises a phase of computing the associated redundancy code for this user data;
the phase of computing includes a sub-phase of calculating this associated redundancy code from an application to this user data of a special error correction code algorithm;
this special error correction code algorithm comprises the following mathematical formula:

$$SECC(X) = BECC\ (X)\ XOR\ BECC(W\ E)XOR(RC\ E)$$

with:
X: the binary value of the user data;
BECC (X): a binary code of a redundancy code of the user data obtained from a binary error correction code algorithm;
BECC (W E): a binary code of a redundancy code of an erased word obtained from a binary error correction code algorithm;
RC E: a binary code of a redundancy code having a binary value similar to that of a binary code of the erased word.
the sub-step of performing comprises a phase of obtaining the erased redundancy code corresponding to the associated redundancy code for a word related to this user data if its binary code is similar to the reference binary code;
the sub-step of performing comprises a phase of obtaining a specific redundancy code corresponding to the associated redundancy code for a word related to this user data if its binary code is different to the reference binary code;
the step of storing comprises a sub-step of writing in the page an encoded data comprising a word related to this user data with the associated redundancy code provided;
the method comprises a step of accessing to a user data stored in the page of the memory element, implemented by the controller;
the step of accessing comprises a sub-step of reading in this page an encoded data relating to this user data;
the step of accessing includes a sub-step of providing the user data relating to this encoded data in function of its consistency status;
the sub-step of providing includes a phase of performing error correction code calculations on the encoded data;
the phase of performing includes a sub-phase of obtaining the user data if the coherence status provides that:
the user data has been decoded, that is to say no correction has been realised on the word corresponding to this user data because no SECC error has been identified, or
the word W 0-N has been corrected, because at least one SECC error corrigible has been identified.
the phase of performing includes a sub-phase of obtaining an error if the coherence status provides that the word relating the user data is incorrigible because at least one SECC error non-corrigible has been identified.

The invention also relates to a non-transitory computer-readable medium storing computer instructions configured to cause a microprocessor of controller to:
store a user data in a page of a memory element of a memory system, this page comprising at least one encoded data consisting in a binary code being formed by a word and its associated redundancy code, and
perform error correction code calculations on the user data providing the associated redundancy code corresponding to an erased redundancy code for this user data if it has a reference binary code of an erased word the said erased redundancy code having a binary value similar to that of the reference binary code.

BRIEF DESCRIPTION OF THE DRAWINGS

The present invention will be described subsequently in more detail with reference to the attached drawing, given by way of examples, but in no way limited thereto, in which.

DETAILED DESCRIPTION OF THE INVENTION

The following description is intended to illustrate specific embodiments of the invention, and not to limit the invention. Thus, nothing in this detailed description is intended to imply that any particular feature, characteristic or component is essential to the invention. The invention is defined only by the claims.

Referring now to the figures, embodiments of the present invention, relates to a method for managing data stored in a page P of a memory element 102 of a memory system 100. Such a method is able to implement a particular error correction code algorithm also named "error correcting code algorithm", here a special error correction code algorithm, also called "SECC algorithm". This SECC algorithm is notably configured to exclude error generation when the word is an erased word comprised in the page P within the memory element 102. This SECC algorithm is used to encode data to be stored into the page P of the memory element, and to decode stored data of this page P.

In this context, the use of this SECC algorithm also enables the accuracy of data stored within the page P to be improved. It can be noted that the implementation of this SECC algorithm limits or even avoids the generation of false errors in comparison with the error correction code algorithms of the prior art.

Such a SECC algorithm comprises the following mathematical formula:

$$SECC(X) = BECC(X)\ XOR\ BECC(W\ E) XOR(RC\ E)$$

with:

X: the binary value of an user data;

BECC (X): a binary code of a redundancy code of the user data obtained from a binary error correction code algorithm also called "BECC algorithm" which can be, for example, part of a family of linear error-correcting codes;

BECC (W E): a binary code of a redundancy code of an erased word W E obtained from the BECC algorithm;

RC E: a binary code of a redundancy code RC E:
  having a binary value similar to that of a binary code of the erased word W E, or
  being equal bitwise (or at bit level) to a binary code of the erased word W E.

Figure 1:
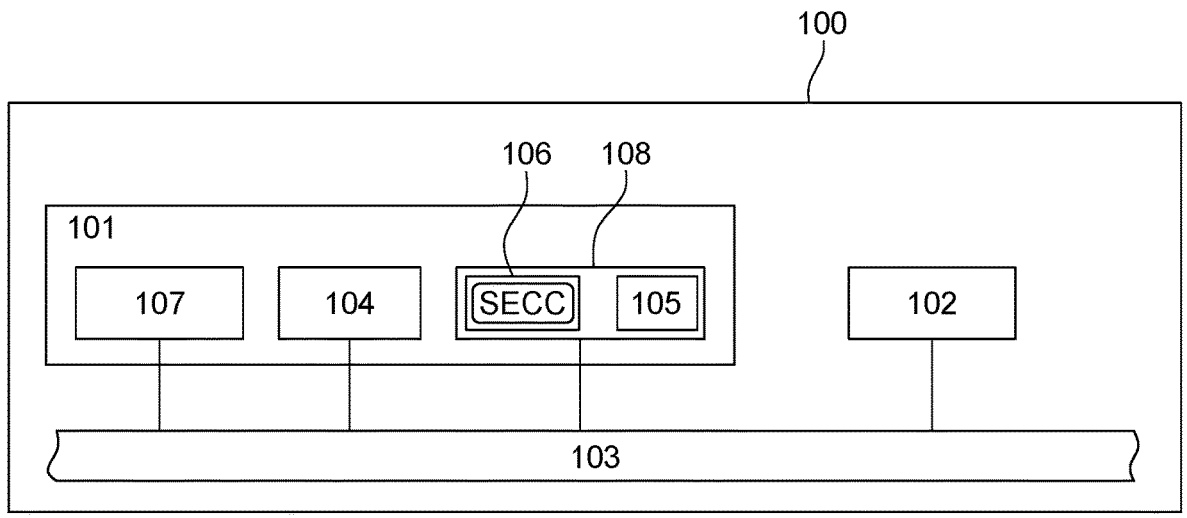
FIGS. 1 and 2 are block diagrams of a memory system, according to embodiments of the present disclosure.

In reference to FIG. 1, this method is implemented by the memory system 100. This memory system 100 includes preferably the following functional elements: a controller 101 also called "memory controller", the memory element 102 and a system bus 103.

In this configuration, the system bus 103 allows the controller 101 and the memory element 102 to communicate with each other. More specifically, the system bus 103 may be provided between memory element 102 and the controller 101 to enable information to be read from and written in a page P of this memory element 102.

In this system 100 the controller 101 includes a microprocessor 104 and memory means 108. Those memory means 108 can comprise a random access memory 105 also called RAM and a read only memory 106 also called ROM and input/output circuits 107. The ROM 106 can include a computer program for managing data in the memory element 102 of this system 100 implementing the SECC algorithm.

More specifically, it can be noted that the memory element 102 may be managed by the microprocessor 104 of this controller 101 which effectively executes either or both software and firmware which is arranged to control this memory element 102. That is, microprocessor 104 may run code devices (not shown), i.e., software code devices or firmware code devices, which allow the memory element 102 to be controlled. Such code devices may enable physical blocks in the memory element 102 to be addressed, and may enable information to be stored into, read from, and erased from the physical blocks.

In this system 100, the memory element 102 can be for example:
  a non-volatile memory which is a type of computer memory that can retain stored information even after power is removed like a flash memory, read-only memory, and/or
  a volatile memory which is a type of memory that maintains its data only while the device is powered, like for example Cache memory and Random Access Memory.

Such a memory system 100 can be part of an electronic device or can be used in conjunction with a host system, such that the host system or the electronic device may write data to or read data from this memory system 100 taking place notably via the input/output circuits 107 of this memory system 100.

In reference to FIG. 2, the memory system 100 will be described in more detail in accordance with an embodiment of the present invention. As described above, the memory system 100 includes the memory element 102 and the controller 101. This memory element 102 and the controller 101 may be primary components of this system 100. This memory element 102 may be formed by an array of memory cells comprised on a semiconductor substrate.

In this context, the array is divided into a large number of BLOCKS 0-N memory cells. Each block is typically divided into a number of pages P. As it will be appreciated by those skilled in the art, a page P may be the smallest unit of programming.

Figure 2:
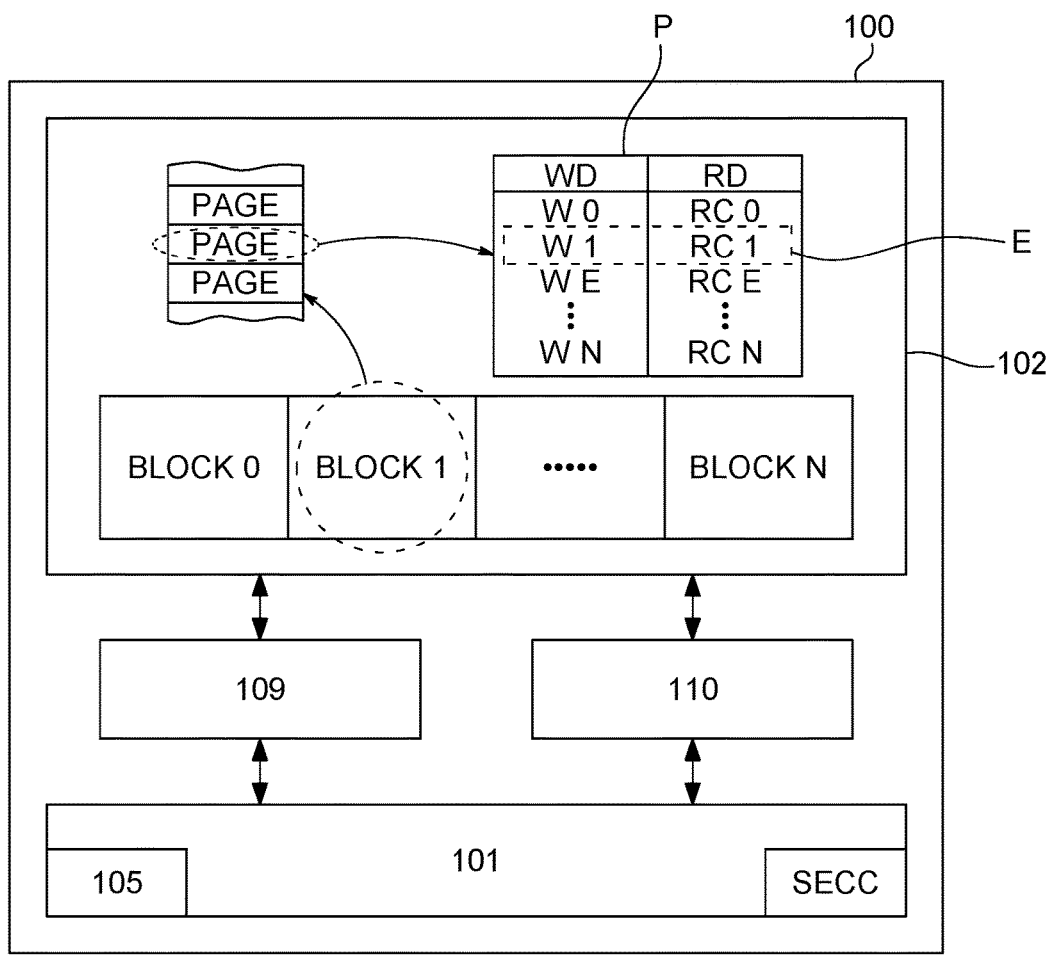

As shown in FIG. 2, the memory element 102 includes word data WD and redundancy code data RD. Word data WD includes one or several words W 0-N and redundancy code data RD typically includes redundancy codes RC 0-N that have been calculated from the user data related to the words W 0-N. In this memory element 102 each word and its redundancy code RC 0-N also called "associated redundancy code" form an encoded data. In this encoded data, each word and its redundancy code can be interleaved or interlaced together.

In this page P where each associated redundancy code RC 0-N is specific to a given word W 0-N, the words W 0-N and their corresponding redundancy codes RC 0-N each consist of a binary code. In this context, the controller 101 of system 100 calculates the redundancy code RC 0-N when data is being programmed into array, and also checks the redundancy code RC 0-N when data is being read from array.

The memory element 102 is typically addressed by the controller 101, particularly by its microprocessor 104, through address decoders 109. Decoders 109 apply the correct voltages to gate and bit lines of array in order to program data to, read data from, or erase a group of memory cells being addressed by the controller 101. Additional circuits 110 include programming drivers that control voltages applied to elements of the array that depend upon the data being programmed into an addressed group of cells. Circuits 110 also include sense amplifiers and other circuits necessary to read data from an addressed group of memory cells. Data to be programmed into array, or data recently read from array, are typically stored in a buffer memory RAM within the controller 101. The controller 101 also usually contains various registers for temporarily storing command and status data, and the like.

Figure 3:
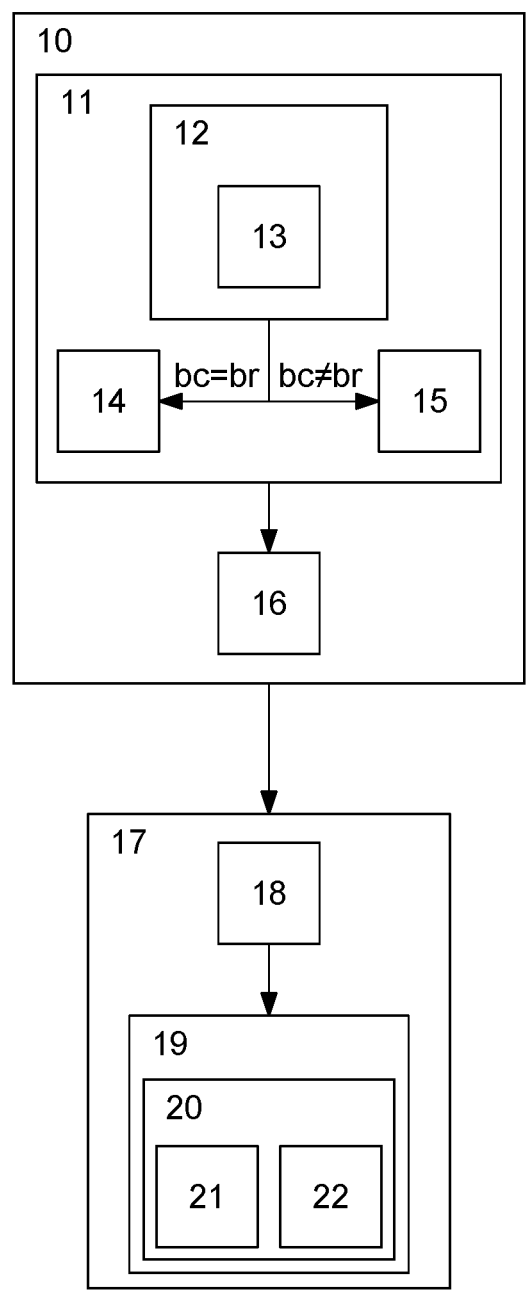
FIG. 3 is a flow chart of a method for managing data stored in a page within a memory element of the memory system, according to embodiments of the present disclosure.

Referring now to FIG. 3, the method for managing data stored in the page P within the memory element 102, is implemented by the memory system 100. Such a method aims to improve the management of the data in the memory element 102. This management mainly concerns the storing and retrieving data in this memory element 102. In other word, this management enables information to be read from and written in this memory element 102.

More specifically, this method includes the step of storing 10 a user data in this page P. This step 10 comprises a sub-step of performing 11 error correction code calculations on the user data providing an associated redundancy code RC 0-N corresponding to an erased redundancy code RC E for this user data if this user data has a reference binary code br of an erased word W E the said erased redundancy code RC E having a binary value similar to that of the reference binary code br. It can be noted that when this user data has a reference binary code br of an erased word W E, that is to say that the binary code of this user data is equal bitwise (at bit level) to this reference binary code.

In this context, the redundancy code of an erased word W E, also called here "erased redundancy code RC E", always have a binary value similar to that of the binary code br of this erased word W E. This binary value concerns the values of all the bits of the binary code of the erased word W E and its redundancy code which can be by convention 0 or 1. In other words, the binary code of the erased redundancy code RC E is equal bitwise (or at bit level) to the binary code br of its erased word W E.

For example, when all the bits of the erased word W E have each the value of "1", all the bits of its redundancy code have also each the value of "1". In other words, this erased word W E has in this page P, a redundancy code called here an "erased" redundancy code, which also has a binary code with all its bits to the value 1.

Then the sub-step 11 comprises a phase of computing 12 the associated redundancy code RC 0-N for this user data. To do that, this phase 12 includes a sub-phase of calculating 13 this associated redundancy code RC 0-N from an application to this user data of SECC algorithm. During this sub-phase 13, the controller run the SECC algorithm in order to compute this associated redundancy code RC 0-N based on the user data.

In this context, the sub-step of performing 11 includes a phase of obtaining 14 an erased redundancy code RC E for this user data when its binary code bc is similar to the reference binary code br. That is, by running the SECC algorithm, the controller has generated this erased redundancy code RC E corresponding to the associated redundancy code RC 0-N for a word related to this user data.

The sub-step of performing 11 also includes a phase of obtaining 15 a specific redundancy code for this user data when its binary code bc is similar to the reference binary code br. That is, by running the SECC algorithm, the controller has generated the specific redundancy code corresponding to the associated redundancy code RC 0-N for a word related to this user data.

It can be noted that the two phases of obtaining 14, 15 is implemented by the controller 101 running the same algorithm, here the SECC algorithm.

Then the step of storing 10 comprises a sub-step of writing 16 in the page P an encoded data E related to the user data. This encoded data E comprises a word W 0-N related to this user data with the associated redundancy code RC 0-N previously provided or obtained. During this sub-step 16, the word corresponding to this user data is stored with its associated redundancy code. In other word, the controller 101 writes in this page P this word corresponding to the user data with its associated redundancy code. As already discussed, this associated redundancy code can be the specific redundancy code or the erased redundancy code previously generated/calculated.

It may be noted that the fact that the step of storing 10 provides an erased redundancy code for user data when the binary code bc of this user data, is similar to that of an erased data, contributes to avoid the generation of an ECC error by the SECC algorithm ran by the controller 101 when this last one reads/access to an erased word W E comprised in a page P of this memory element 102.

Furthermore, the method comprises a step of accessing/collecting 17 a user data stored in the page P. During this step 17, the controller 101 accesses to a page P of the memory element 102 in order to extract/read this user data stored as an encoded data E in this page P. It can be noted that the controller 101 executes this step 17 notably when it is required to read data from this memory system 100 by the electronic device comprising this memory system 100 or by the host system connected to this memory system 100.

To that end, this step of accessing 16 comprises a sub-step of reading 18 in the page P the encoded data E relating to this user data. This encoded data E is formed by a word W 0-N and its associated redundancy code RC 0-N relating to this user data. In this sub-step 18, the encoded data E comprising the word W 0-N and its associated redundancy code RC 0-N, is collected in order to be processed by the controller 101 which runs the SECC algorithm.

More specifically, the step of accessing 17 includes a sub-step of providing 19 the user data relating to this encoded data E in function of its consistency status. This sub-step 19 includes a phase of verifying 20 the consistency of the word W 0-N included in the encoded data E. During this phase 20, the controller by running the SECC algorithm, controls if this word W 0-N is consistent with its associated redundancy code RC 0-N. Then, this phase 20 comprises a sub-phase of obtaining 21 the user data if the coherence status provides that:
  the user data has been decoded, that is to say no correction has been realised on the word W 0-N corresponding to this user data because no ECC error has been identified, or
  the word W 0-N has been corrected, because at least one SECC error corrigible has been identified.

This phase 20 can also comprise a sub-phase of obtaining 22 an error if the coherence status provides that the word W 0-N relating the user data is incorrigible because at least one SECC error non-corrigible has been identified.

The foregoing is only illustrative of preferred embodiments of the present invention. The present invention is not limited to the above embodiments. It should be understood that further improvements and changes that are directly derived or conceived by those skilled in the art without departing from the basic concept of the present invention should be considered to be included in the protective scope of the present invention.

The invention claimed is:

1. A method for managing data stored in a page within a memory element of a memory system that includes a controller, the page comprising encoded data including a binary code being formed by a word and an associated redundancy code, the method comprising:
   storing, by the controller, user data in said page,
   said storing step including performing error correction code calculations on the user data to provide the associated redundancy code, which corresponds to an erased redundancy code (RC_E) for said user data, in response to determining that the user data has a reference binary code of an erased word (W_E) and the erased redundancy code (RC_E) has a binary value equal to that of the reference binary code.

2. The method according to claim 1, wherein the performing step further comprises computing the associated redundancy code for said user data.

3. The method according to claim 2, wherein the computing step further comprises calculating said associated redundancy code from an application of a special error correction code algorithm (SECC) to the user data.

4. The method according to claim 3, wherein said special error correction code algorithm (SECC) comprises:

$$SECC(X) = BECC(X) \text{ XOR } BECC(W\_E) \text{ XOR } (RC\_E)$$

with:
X: a binary value of the user data;
BECC: a binary code of a redundancy code of the user data obtained from a binary error correction code algorithm;
BECC (W_E): a binary code of a redundancy code of the erased word (W_E) obtained from a binary error correction code algorithm (BECC);
RC_E: a binary code of the erased redundancy code RC_E having the binary value similar to that of the binary code of the erased word (W_E).

5. The method according to claim 1, wherein the performing step further comprises obtaining the erased redundancy code (RC_E) corresponding to the associated redundancy code for a word related to said user data, if a binary code of the erased redundancy code (RC_E) is similar to the reference binary code.

6. The method according to claim 1, wherein the performing step further comprises obtaining a redundancy code corresponding to the associated redundancy code for a word related to said user data, if a binary code of the erased redundancy code (RC_E) is different from the reference binary code.

7. The method according to claim 1, wherein the step of storing step further comprises writing, in the page, the encoded data comprising the word related to said user data with the associated redundancy code provided.

8. The method according to claim 1, wherein the method further comprises accessing, by the controller, the user data stored in the page of the memory element.

9. The method according to claim 8, wherein the accessing step further comprises reading, in said page, the encoded data relating to said user data.

10. The method according to claim 8, wherein the accessing step further comprises providing the user data relating to said encoded data based on a coherence status of the encoded data.

11. The method according to claim 10, wherein the providing step further comprises performing the error correction code calculations on the encoded data.

12. The method according to claim 11, wherein the performing step further comprises obtaining the user data when the coherence status provides that:
   the user data has been decoded, and no correction has been realized on the word corresponding to said user data because no SECC error has been identified, or
   the word has been corrected, because at least one SECC error corrigible has been identified.

13. The method according to claim 11, wherein the providing step further comprises performing the error correction code calculations on the encoded data, including obtaining an error when the coherence status provides that the word corresponding to the user data is incorrigible because at least one SECC error non-corrigible has been identified.

14. A non-transitory computer-readable medium storing computer instructions configured to cause a microprocessor of a controller to:
   store user data in a page of a memory element of a memory system, said page comprising encoded data including a binary code being formed by a word and an associated redundancy code, and
   perform error correction code calculations on the user data to provide the associated redundancy code, which corresponds to an erased redundancy code for said user data, in response to determining that the user data has a reference binary code of an erased word and the erased redundancy code has a binary value equal to that of the reference binary code.

* * * * *